Feb. 18, 1969 R. M. QUINN ET AL 3,428,819

ELECTRONIC MONITORING SYSTEM FOR APPARATUS HAVING MULTI-STATIONS WHICH HAS A SEPARATE MEMORY CELL FOR REGISTERING THE STATUS OF EACH STATION OF THE APPARATUS

Filed April 18, 1966 Sheet 1 of 3

INVENTORS.
RICHARD M. QUINN
DONNY W. CANDIOTO
BY
Campbell & Harris
ATTORNEYS

Feb. 18, 1969 R. M. QUINN ET AL 3,428,819

ELECTRONIC MONITORING SYSTEM FOR APPARATUS HAVING MULTI-STATIONS WHICH HAS A SEPARATE MEMORY CELL FOR REGISTERING THE STATUS OF EACH STATION OF THE APPARATUS

Filed April 18, 1966 Sheet 2 of 3

INVENTORS.
RICHARD M. QUINN
DONNY W. CANDIOTO
BY
Campbell & Harris
ATTORNEYS

INVENTORS.
RICHARD M. QUINN
DONNY W. CANDIOTO
BY
Campbell & Harris
ATTORNEYS

United States Patent Office 3,428,819

Patented Feb. 18, 1969

3,428,819

ELECTRONIC MONITORING SYSTEM FOR APPARATUS HAVING MULTI-STATIONS WHICH HAS A SEPARATE MEMORY CELL FOR REGISTERING THE STATUS OF EACH STATION OF THE APPARATUS

Richard M. Quinn and Donny W. Candioto, Muncie, Ind., assignors to Ball Brothers Company Incorporated, Muncie, Ind., a corporation of Indiana Filed Apr. 18, 1966, Ser. No. 543,295
U.S. Cl. 250—223 11 Claims
Int. Cl. H01j *39/12*

This invention relates to an electornic monitoring system and, more particularly, relates to an electronic monitoring system for use with apparatus having multiple stations.

It is oftentimes necessary to provide apparatus having multiple stations in order to effectively and efficiently accomplish a given end. Such apparatus may be necessary, for example, where an article is manufactured in sequential steps with a portion of the work required being performed at each of the plurality of work stations within the apparatus. Such apparatus, or machines, having a plurality of work stations, are presently in wide usage for a variety of diverse purposes, such as, for example, to form or shape various metal articles.

In some apparatus of this general type, it is common for the articles to be moved at a rapid rate, especially where small articles are involved, and for the article conveyor to be essentially a disc-like structure so that articles are continually fed into the apparatus at an entrance point, rapidly carried to each work station in succession, and then ejected at an exit point which may be near the entrance point.

In this type of apparatus, if an article is not ejected at the exit point, the article is quickly carried back to the entrance point and an equipment jam occurs, often resulting in expensive time delays as well as equipment loss due to part or tool breakage. While an operator could conceivably constantly monitor each machine and stop the same in time to prevent damage when slow moving conveyors are utilized, it becomes virtually impossible to do so during high speed production where articles are transferred at rapid rate, for example, at a rate of 500 articles per minute.

It is therefore a feature of this invention to provide an electronic monitoring system capable of automatically monitoring article entrance to an exit from apparatus having multiple work stations and quickly stopping said apparatus to prevent equipment damage whenever an article fails to exit from said apparatus at a predetermined time.

It is therefore an object of this invention to provide an electronic monitoring system particularly well suited for use with apparatus having a plurality of work stations for preventing damage to said apparatus due to failure of a processed article to exit from the apparatus at the proper time.

It is another object of this invention to provide an electronic monitoring system for use in conjunction with apparatus having multiple work stations that is capable of sensing the presence of a given article in said apparatus and monitoring the same to assure that said article exits from the apparatus at the proper time.

It is still another object of this invention to provide an electronic monitoring system for use in conjunction with apparatus having multiple work stations that is capable of sensing the presence of a given article, retaining the sensed information as said article is processed through said work staitons, and, in response to failure of the article to exit from the apparatus, stopping said apparatus so that damage is automatically prevented.

With these and other objects in view which will become apparent to one skilled in the art as the description proceeds, this invention resides in the novel construction, combination and arrangement of parts substantially as hereinafter described, and more particularly defined by the appended claims, it being understood that such changes in the precise embodiment of the herein disclosed invention are meant to be included as come within the scope of the claims.

The accompanying drawings illustrate one complete embodiment of the invention according to the best mode so far devised for the practical application of the principles thereof, and in which.

Figures 1, 3, 4, 5:
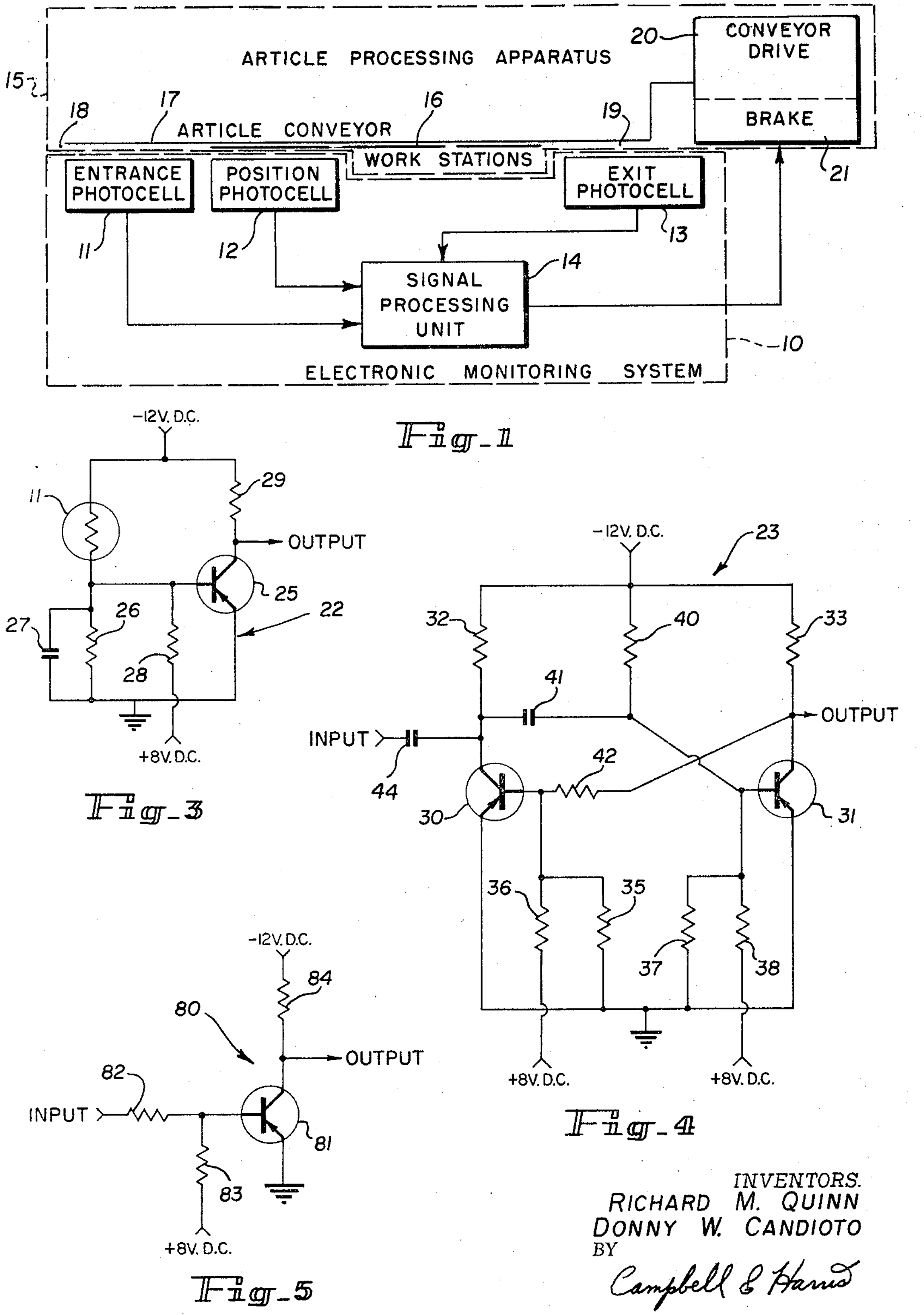
FIGURE 1 is a schematic and block diagram illustrating the electronic monitoring system of this invention utilized in conjunction with apparatus having a plurality of work stations.
FIGURE 3 is a schematic presentation of a photocell and amplifier circuit utilized in the electronic monitoring system of this invention.
FIGURE 4 is a schematic presentation of a monostable multivibrator utilized in the electronic monitoring system of this invention.
FIGURE 5 is a schematic presentation of an inverter utilized in the electronic monitoring system of this invention.

Referring now to the drawings, the numeral 10 refers generally to the electronic monitoring system of this invention, which system, as shown in FIGURE 1, includes entrance photocell 11, position photocell 12, exit photocell 13, and signal processing unit 14.

As shown schematically in FIGURE 1, monitoring system 10 is utilized in conjunction with article processing apparatus 15, which apparatus includes a plurality of work stations 16 (the number of which will be dependent upon the number required for any particular end to be accomplished). Articles to be processed are successively conveyed to each work station by an article conveyor 17, such as a rotating disc, for example, so that articles are received at the entrance 18 of the apparatus 15, conveyed to each work station 16, and then ejected from the apparatus at exit 19. Conveyor 17 is driven conventionally (either continuously or intermittently as needed) by conveyor drive 20, which includes a brake 21 to quickly stop the conveyor when the brake is applied.

While not limited to such use, the electronic monitoring system of this invention is particularly well suited for use with apparatus wherein the article processed is carried back to the apparatus entrance if not ejected from the exit. When this occurs, the apparatus jams if articles are being continuously fed thereto and frequently results in breakage of vital parts.

Essentially, the electronic monitoring system of this invention senses the article as it enters the apparatus and provides this information to a first memory unit where it is stored. This information is then stepped to successive memory units concurrently with transfer of the article to each succeeding work station so that when the article arrives at the last work station the information concerning article presence is stored in the last memory unit. This information in the last memory unit is then utilized in conjunction with information derived from sensing whether the article has been ejected from the apparatus to control energization of a control relay, which relay is energized to stop the conveyor if an article enters the apparatus but fails to exit therefrom.

Figure 2:
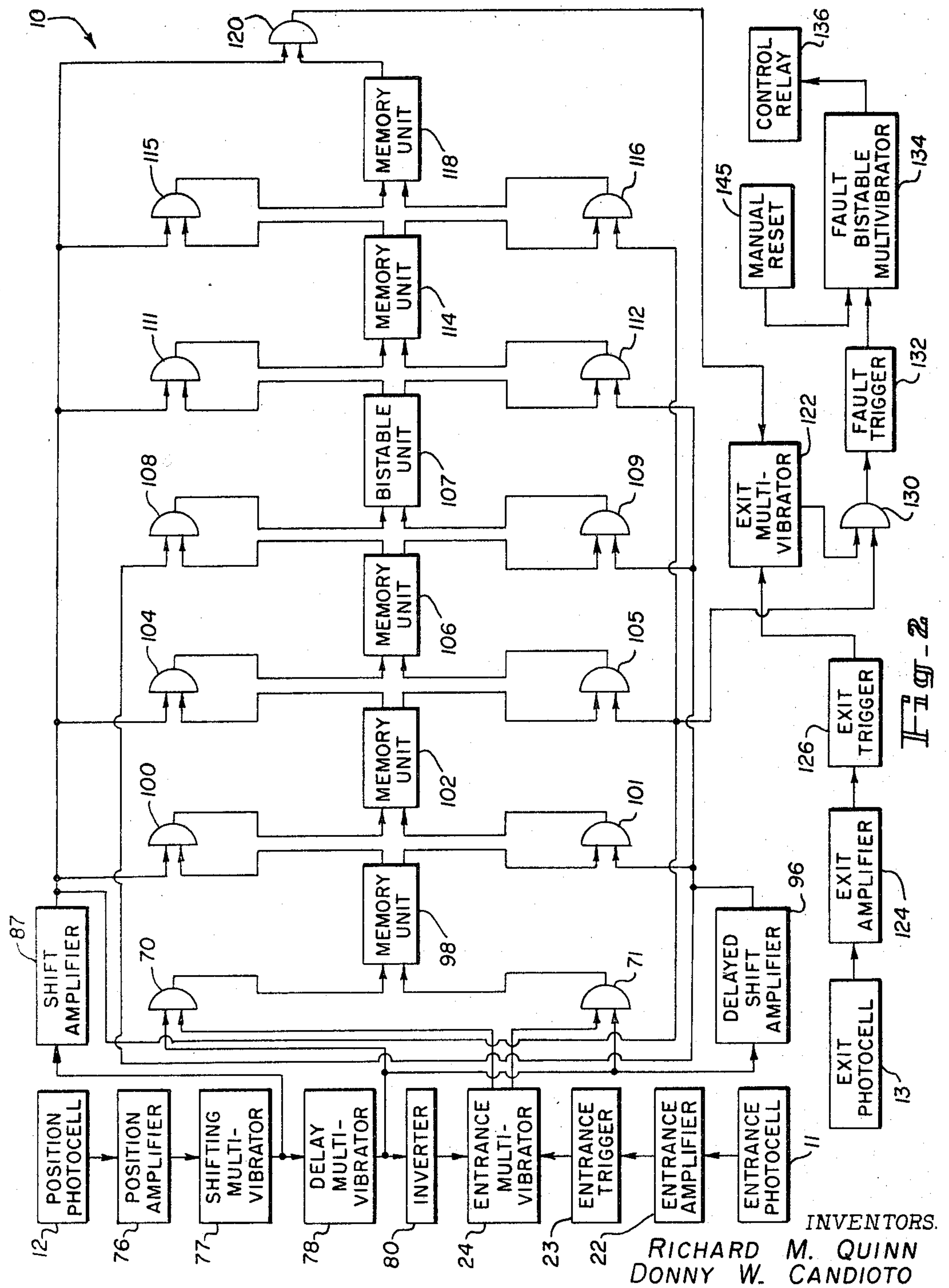
FIGURE 2 is a block diagram of the electronic monitoring system of this invention.

Referring to FIGURE 2, entrance photocell 11 generates an output pulse when the article breaks the light beam as the article is advanced to the first work station. This pulse is amplified by entrance amplifier 22, the output of which is coupled to entrance trigger 23. Entrance trigger 23 is a monostable multivibrator, the output of which is coupled to one side of entrance bistable multivibrator 24.

Entrance photocell 11 and entrance amplifier 22 are illustrated in schematic form in FIGURE 3. As shown therein, photocell 11 is connected between a power source of −12 volts D.C. (not shown) and the base of PNP type transistor 25, which base is also connected to ground through parallel connected resistor 26 and capacitor 27, and to a +8 volt D.C. power supply (not shown) through resistor 28. In addition, the emittter of transistor 25 is grounded, while the collector is connected to the −12 volt D.C. source (not shown) through resistor 29. A pulse generated at photocell 11 is applied to the base of transistor 25 and the amplified output is taken from the collector, as shown in FIGURE 3. A light source (not shown) is positioned so that the light reaching each photocell first passes through or is reflected by the portion of the article being transferred so as to generate the pulse at the photocell as is well known in the photocell art.

Entrance trigger 23 is a monostable multivibrator and is shown in schematic form in FIGURE 4. Monostable multivibrator 23 includes a pair of PNP type transistors 30 and 31, both of which have grounded emitters. The collector of transistors 30 and 31 are connected to the −12 volt D.C. power supply (not shown) through resistors 32 and 33, respectively. The base of transistor 30 is connected to the junction of series connected resistors 35 and 36, and which resistors are connected as a voltage divider between ground and the +8 volt D.C. power supply (not shown). In like manner, the base of transistor 31 is connected to the junction of serially connected resistors 37 and 38 which resistors also are connected as a voltage divider between ground and the +8 volt D.C. power supply (not shown).

The base of transistor 31 is connected to the −12 volt D.C. power supply (not shown) through resistor 40 and to the collector of transistor 30 through charging capacitor 41, while the base of transistor 30 is connected to the collector of transistor 31 through resistor 42. The input pulse to trigger the monostable multivibrator is coupled through coupling capacitor 44 and charging capacitor 41 to the base of transistor 31, while the output from the monostable multivibrator is taken from the collector of transistor 31.

In operation, transistor 31 is normally conductive while transistor 30 is normally nonconductive. When a positive input pulse is coupled to the monostable multivibrator, it passes through charging capacitor 41 to the base of transistor 31 to cause the output voltage at the collector of transistor 31 to increase. Since the base of transistor 30 is connected to the collector of transistor 31, the increase in negative voltage at the collector allows transistor 30 to start to conduct and this results in transistor 31 being rendered nonconductive since the collector of transistor 30 is connected to one side of capacitor 41, the other side of which is connected to the base of transistor 31. After capacitor 41 has charged to the cut-off point of transistor 31, transistor 31 will again become conductive and cut-off transistor 30 (since the collector of transistor 31 is connected through resistor 42 to the base of transistor 30). Transistor 31 will then remain in a conductive state and transistor 30 will remain in a nonconductive state until a new input pulse is received to again cause transistor 31 to cease conducting.

Figure 6:
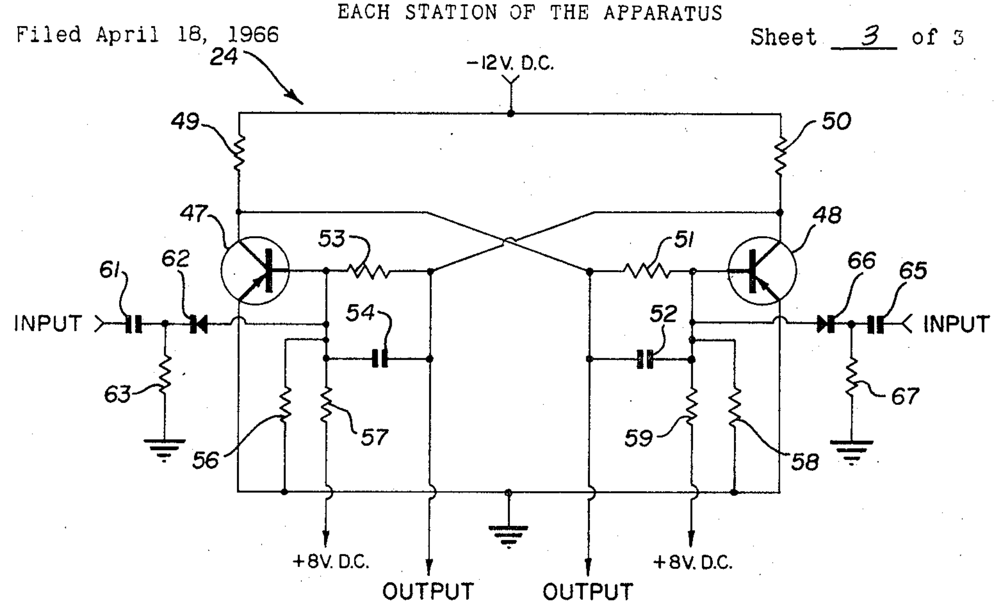
FIGURE 6 is a schematic presentation of a bistable multivibrator utilized in the electronic monitoring system of this invention.

Entrance multivibrator 24 is a bistable multivibrator and is shown in schematic form in FIGURE 6. As is well known in the art, a bistable multivibrator, or flip-flop, is capable of remaining in either one of two stable states and requires an external signal of proper polarity to cause a change of state.

As shown in FIGURE 6, bistable multivibrator 24 includes a pair of PNP type transistors 47 and 48, both of which have grounded emitters. The collectors of transistors 47 and 48 are connected to a −12 volt D.C. power supply (not shown) through resistors 49 and 50, respectively, and the collector of transistor 47 is connected to the base of transistor 48 through parallel connected resistor 51 and capacitor 52, while the collector of transistor 48 is connected to the base of transistor 47 through parallel connected resistor 53 and capacitor 54. The base of transistor 47 is connected to the junction of serially connected resistors 56 and 57, which resistors are connected as a voltage divider between the +8 volt D.C. power supply (not shown) and ground. In like manner, the base of transistor 48 is connected to the junction of serially connected resistors 58 and 59, which resistors are also connected as a voltage divider between the +8 volt D.C. power supply (not shown) and ground.

One input to the bistable multivibrator is coupled to the base of transistor 47 through serially connected capacitor 61 and diode 62, the junction of which has a resistor 63 to ground, while a second input to the multivibrator is coupled to the base of transistor 48 through serially connected capacitor 65 and diode 66, the junction of which also has a resistor 67 to ground. As is conventional, outputs can be coupled from the multivibrator from each of the collectors, as indicated in FIGURE 6.

In operation, one transistor is in a conductive state while the other transistor is in a nonconductive state. When a negative input pulse is coupled to the base of transistor 47, transistor 47 will be unaffected if in a conductive state. If transistor 47 is in a nonconductive state, however, this pulse will cause transistor 47 to start to conduct. Since the collector of transistor 47 is connected through resistor 51 and capacitor 52 to the base of transistor 48, conduction of transistor 47 will cause transistor 48 to be cut off. Transistor 47 will thereafter continue to conduct and hold transistor 48 in a nonconductive state until an external pulse is coupled to the multivibrator to cause it to again change states (as, for example, coupling a negative pulse to the base of transistor 48 through the other input).

Figures 7, 8, 9:
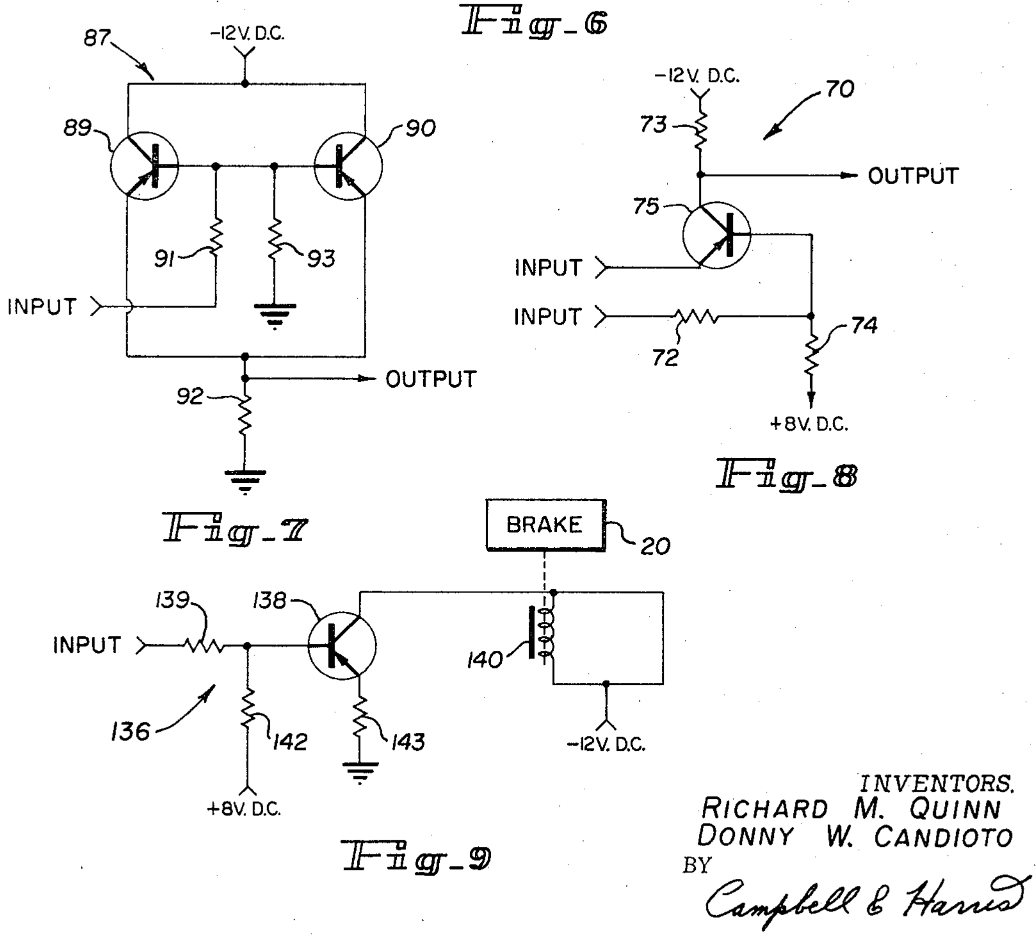
FIGURE 7 is a schematic presentation of an amplifier utilized in the electronic monitoring system of this invention.
FIGURE 8 is a schematic presentation of an AND gate utilized in the electronic monitoring system of this invention.
FIGURE 9 is a schematic presentation of the control relay circuitry utilized in the electronic monitoring system of this invention.

As shown in FIGURE 2, one output from entrance multivibrator 24 is connected to AND gate 70, while the other output is connected to AND gate 71. AND gates 70 and 71 may be identical and only AND gate 70 is shown in schematic form herein in FIGURE 8. As shown in FIGURE 8, AND gate 70 has two inputs, one of which is directly connected to the emitter of transistor 75 (from the output of bistable multivibrator 24), while the other is connected to the base of transistor 75 through resistor 72. As shown in FIGURE 8, the collector of transistor 75 is connected to the −12 volt D.C. power supply (not shown) through resistor 73, while the base is connected to the +8 volt D.C. power supply (not shown) through resistor 74. As is conventional, the presence of a signal at both inputs is necessary in order for transistor 75 to be conductive so that an output pulse is coupled from the collector of the transistor.

The second input to AND gates 70 and 71 is derived from position photocell 12. As shown in FIGURE 2, the output pulse from position photocell 12 is coupled through position amplifier 76 to shifting multivibrator 77. The output from shifting multivibrator 77 is then coupled to a delay multivibrator 78, the output from which is coupled to AND gates 70 and 71.

Position amplifier 76 is identical to entrance amplifier 23, while shifting multivibrator 77 and delay multivibrator 78 are both monostable multivibrators similar in structure to the monostable multivibrator, or entrance trigger, 23, shown in FIGURE 4 of the drawings. The only exception to this is that, in the case of shifting multivibrator 77, the input signal is coupled through coupling capacitor 44 to the base of the normally nonconductive transistor (transistor 30, as shown in FIGURE 4), rather than to the base of normally conductive transistor (transistor 31, as shown in FIGURE 4), while the pulse from shifting multivibrator 77 coupled to delay multivibrator 78 is coupled through a diode (not shown) connected in series with the coupling capacitor with the anode of said diode being connected to the capacitor and the cathode connected to multivibrator 78 (this allows the trailing edge of the output pulse from shifting multivibrator 77 to be used to trigger delay multivibrator 78). In addition, a resistor (not shown) is connected between ground and the junction of the coupling capacitor and diode.

The output from shifting multivibrator 77 and delay multivibrator 78 operate the various AND gates in the processing unit to step the information to each succeeding memory unit concurrently with and in response to a shift of articles between positions sensed by position photocell 12.

As shown in FIGURE 2, the output from delay multivibrator 78 is coupled through an inverter 80 to the other input of entrance bistable multivibrator 24 to reset the bistable multivibrator at the end of the delay pulse from multivibrator 78. Inverter 80 is shown in schematic form in FIGURE 5, and includes a PNP type transistor 81, the emitter of which is connected to ground and the base of which receives the input signal through resistor 82. The base of transistor 81 is also connected to the +8 volt D.C. power supply (not shown) through resistor 83, while the collector is connected to the −12 volt D.C. power supply (not shown) through resistor 84. Since the input signal is coupled to the base of the transistor, the output is inverted, with respect to input, when taken from the collector.

The output from shifting multivibrator 77 is coupled to a shift amplifier 87, which amplifier is shown in schematic form in FIGURE 7. As shown in FIGURE 7, amplifier 87 includes a pair of PNP type transistors 89 and 90, the collectors of which are directly connected to the −12 volt D.C. power supply (not shown). The input to the amplifier is coupled through resistor 91 to the base of transistor 89, while the output is taken from the directly connected emitters of transistors 89 and 90, which emitters are connected through a resistor 92 to ground. In addition, the commonly connected bases of transistors 89 and 90 are connected to ground through resistor 93.

The output from delay multivibrator 78, in addition to being coupled directly to AND gates 70 and 71, is coupled to delayed shift amplifier 96, which amplifier is identical to shift amplifier 87.

As shown in FIGURE 2, the outputs from AND gates 70 and 71 are connected to memory unit 98, which unit is a bistable multivibrator, or flip-flop, identical to bistable multivibrator 24. The memory unit, of course, will be set in one of two stable states depending upon whether the output is received from AND gate 70 or AND gate 71 (and this depends upon whether an article has been sensed entering the apparatus), and the output from memory unit 98 will, of course, depend upon the state assumed.

The output from delay multivibrator 78 supplies a pulse to both AND gates 70 and 71, so that the state of memory unit 98 is set depending upon whether or not an article was sensed as entering the apparatus. The state of memory unit 98 is then maintained even though at the end of the delay multivibrator pulse the inverted pulse causes entrance multivibrator 24 to be reset so that the next article can be sensed as it enters the processing apparatus.

The outputs from memory unit 98 are connected to a pair of AND gates 100 and 101, each of which is identical to AND gate 70, while the output from AND gates 100 and 101 are connected to the inputs of memory unit 102, which unit is a bistable multivibrator identical to bistable multivibrator 24. The second input to AND gate 100 is provided by shift amplifier 87, while the second input to AND gate 101 is provided by delayed shift amplifier 96. Thus, the information stored on memory unit 98 (i.e., the state of the multivibrator) will be stepped to the next memory unit (unit 102) when the article shifts position (as sensed by position photocell 12).

The outputs from memory unit 102 are connected to AND gates 104 and 105 (identical to AND gates 70 and 71), as shown in FIGURE 2, while the outputs from AND gates 104 and 105 are coupled to memory unit 106, which unit is identical to memory unit 98. The second input to AND gates 104 and 105 is supplied by shift amplifier 87 and, of course, shift amplifier 87 provides a pulse only after position photocell 12 detects article transfer to the next station. It is necessary to operate AND gate 105 with an output pulse from shift amplifier 87, rather than an output pulse from delayed shift amplifier 96, since information being transferred to memory unit 102 concerning the next article in line could cause erroneous information to be transferred (as would be the case if memory unit 102 was caused to change states due to a pulse from AND gate 100, which gate receives an input from shift amplifier 87). However, by transferring the information from memory unit 102 to memory unit 106 on the shift pulse and by providing an additional bistable unit 107, this possible erroneous transfer is avoided.

Bistable unit 107 is a bistable multivibrator identical to multivibrator 106, and is connected to memory unit 106 through AND gates 108 and 109, which are identical to AND gates 104 and 105. Both AND gates 108 and 109 receive a second input from delayed shift amplifier 96 so that bistable unit 107 assumes the state of memory unit 106 when the delayed pulse from delayed shift amplifier 97 occurs.

The output from bistable unit 107 is coupled to AND gates 111 and 112 (identical to AND gates 108 and 109), the former of which receives a second input from shift amplifier 87 and the latter of which receives a second input from delayed shift amplifier 96. The outputs from AND gates 111 and 112 are connected to memory unit 114, which is identical to memory unit 106.

The outputs from memory unit 114 are connected to AND gates 115 and 116 (identical to AND gates 111 and 112), which AND gates receive a second input from shift amplifier 87. The outputs from AND gates 115 and 116 are connected to memory unit 118, which is identical to memory unit 114.

As shown in FIGURE 2, memory unit 118 is the last of the cascaded memory units (the number of units, of course, can be varied as needed so that the number of memory units equals the number of stations whereby information concerning a given article is transferred to the last memory unit at the same time that article reaches the last station in the processing apparatus).

A single output is taken from memory unit 118 and connected to AND gate 120 (identical to AND gate 115) and a second output is coupled to AND gate 120 from shift amplifier 87. The output from AND gate 120 is connected to one side of exit multivibrator 122, which multivibrator is a bistable multivibrator identical to entrance multivibrator 24. A pulse will be coupled from AND gate 120 only when memory unit 118 receives a pulse from AND gate 115 to set the state of multivibrator 118.

Exit multivibrator 122 receives a second input from exit photocell 13 coupled through exit amplifier 124 and exit trigger 126. Exit amplifier 124 is identical to entrance amplifier 22, while trigger 126 is identical to entrance trigger 23. Exit multivibrator 122 has a single output connected to AND gate 130, which AND gate is identical to AND gate 120. A pulse is coupled from AND gate 130 only if a pulse is coupled to exit multivibrator 122 from AND gate 120 and no pulse is coupled to exit multivibrator 122 from exit photocell 13. AND gate 130 receives a second input from shift amplifier 87, so that if an output pulse is received from exit multivibrator 122, a pulse is coupled from AND gate 130 to fault trigger 132. Fault trigger 132 is a monostable multivibrator identical to entrance trigger 23 and the output from fault trigger 132 is coupled to fault bistable multivibrator 134, which multivibrator is identical to entrance multivibrator 24. If a pulse is coupled to fault bistable multivibrator 134 from fault trigger 132, an output pulse from fault multivibrator 134 energizes control relay circuit 136, which relay controls brake 21 of conveyor drive 20.

Control relay circuit 136 is shown in FIGURE 9 to include a PNP type transistor 138, the base of which is connected to receive the input signal through a resistor 139 and the collector of which is connected to relay winding 140 to energize the same when an input signal is received at the base of the transistor from fault bistable multivibrator 134. As shown in FIGURE 9, relay 140 operates brake 21 of the conveyor drive 20 to quickly stop the conveyor to prevent damage to the apparatus when a fault occurs. The collector of transistor 138 is connected to a −12 volt D.C. power supply (not shown) through resistor 142, and the emitter is connected to ground through resistor 143.

After the conveyor has been stopped by application of brake 21 due to energization of relay 136, the relay will remain energized until fault bistable multivibrator 134 is reset. For this purpose a manual reset 145 is provided, which reset may consist of a push button switch (not shown) and serially connected resistor (not shown), both of which are connected to a power supply source in conventional fashion.

In operation and assuming that an article is sensed by the entrance photocell, entrance multivibrator 24 is set and provides an output to AND gate 70. When the delayed pulse occurs, AND gate 70 then provides an output to memory unit 98 to set the multivibrator and thus store the information thereon that the article has entered the apparatus (thus, the state of memory unit 98 is set so that an output is provided therefrom to AND gate 100). When the position photocell senses article transfer to the next station, the information on memory unit 98 is shifted to memory unit 102 through AND gate 100 when the shift pulse from shift amplifier 87 occurs (thus, the state of memory unit 102 is set so that an output is provided therefrom to AND gate 104).

In like manner, at the next occurrence of article transfer, the information on memory unit 102 will be shifted to memory unit 106 when a shift pulse from shift amplifier 87 occurs (thus, the state of memory unit 106 is set so that an output is provided to AND gate 108). The information on memory unit 106 is immediately shifted to bistable unit 107 (so that the state of unit 107 is set so that an output is provided to AND gate 111) through AND gate 108 when the delayed pulse occurs following the shift pulse which transfers the information to memory unit 106 to thus prevent the prior state causing erroneous information transfer.

The information on bistable unit 107 is shifted to memory unit 114 (to set the state of memory unit 114 so that an output is provided to AND gate 115) when the next article transfer occurs, at which time a shift pulse from shift amplifier 87 is coupled to AND gate 111.

In like manner, when the next article transfer occurs, the information on memory unit 114 will be shifted to memory unit 118 (to set the state of this memory unit so that an output is provided to AND gate 120) when the shift pulse from shift amplifier 87 occurs and is coupled to AND gate 115.

Assuming that memory unit 118 is the last memory unit and that the article has now reached the last station, the output from memory unit 118 coupled to AND gate 120 will be coupled to exit multivibrator 122 at the next occurrence of the shift pulse from shift amplifier 87 since AND gate 120 also receives said shift pulse. This pulse from AND gate 120 causes the state of exit multivibrator 122 to be changed so that an output (which indicates that an article has entered the apparatus and should now exit) is coupled to AND gate 130. If the article does exit from the apparatus, exit photocell 13 provides a pulse to exit trigger 126 to quickly reset multivibrator 122 so that there is no output therefrom to AND gate 130. If, however, the article does not exit from the apparatus, this is an indication of a fault, and since AND gate 130 receives a second input from shift amplifier 87, this fault indication is used to energize control relay 136 to quickly stop the article conveyor in the article processing apparatus.

If no article had entered the apparatus, there would be no pulse output provided by entrance photocell 11 and entrance multivibrator 24 would have provided an output to AND gate 71 and no output to AND gate 70. This information would then have been coupled through AND gates 71, 101, 105, 109, 112, and 116, to memory unit 98, memory unit 102, memory unit 106, bistable unit 107, memory unit 114 and memory unit 118, respectively. Since no output would then be coupled to AND gate 120 from memory unit 118, exit multivibrator 122 is never set to provide an output to AND gate 130 (and hence does not indicate that an article entered the apparatus), and therefore, the conveyor will not be stopped even though no indication of article exit is sensed by exit photocell 13. This not only avoids erroneous stopping of the apparatus if one or more articles should fail to enter the apparatus at any particular time, but also allows articles in the apparatus at various stations to clear the apparatus at the end of a manufacturing operation or day.

In view of the foregoing, it should be appreciated that the electronic monitoring system of this invention provides a heretofore unknown means for monitoring articles transferred through a plurality of work stations and protecting the apparatus against damage through failure of the article to exit from the apparatus at the proper time.

What is claimed is:

1. A system for monitoring articles successively transferred to a plurality of stations, said system comprising: entrance sensing means for sensing the entrance of each article conveyed to the first of said plurality of stations and providing an indication thereof; indication retaining means for retaining each article entrance indication received from said entrance sensing means at least until the time each said article is to exit from the last of said plurality of stations; exit sensing means for sensing the exit of each article from the last of said plurality of stations and providing an indication thereof; and fault determining means for receiving indications from said condition retaining means and said exit sensing means and producing a fault indication whenever an indication is received only from said indication retaining means with respect to a given article.

2. The system of claim 1 wherein said indication retaining means includes a plurality of stages and also includes means for sensing article transfer between stations for shifting each article entrance indication between stages concurrently with article transfer so that each said retained indication with respect to a given article is coupled to said fault determining means as that article is to exit from the last of said plurality of stations.

3. An electronic system for monitoring articles successively transferred to a plurality of stations, said system comprising: entrance sensing means for sensing the entrance of each article conveyed to the first of said plurality of stations and producing an output signal indicative thereof; signal processing means for receiving each said output signal from said entrance sensing means and providing an output signal indicative of article entrance at the time each said article is to exit from the last of said plurality of stations; exit sensing means for sensing the exit of each article from the last of said plurality of stations and producing an output signal indicative thereof; and fault determining means for receiving output signals from said signal processing means and said exit sensing means and producing a fault signal whenever a signal is received from only said signal processing means with respect to a given article.

4. The electronic system of claim 3 wherein said sensing mean includes photocells.

5. The electronic system of claim 3 wherein said fault determining means is a bistable multivibrator which in one state causes a fault signal to be produced and in the other state precludes production of a fault signal.

6. An electronic monitoring system for apparatus wherein articles are successively transferred to a plurality of work stations, said system comprising: entrance sensing mean for sensing the entrance of each article to said apparatus and producing an output signal indicative thereof; a plurality of cascaded memory stages equal in number to the number of said work stations; position sensing means for sensing article transfer movement between stations and, responsive thereto, shifting the information stored at each said memory stage to the next succeeding memory stage; means for receiving said output signal from said entrance sensing means and coupling information to the first of said memory stages indicating whether an article has entered said apparatus; exit sensing means for sensing the exit of articles from said apparatus and providing exit information with respect thereto; fault determining means for receiving said information from the last of said memory stages and from said exit sensing means and producing a fault signal whenever information is received from the last of said memory stages indicating article entrance without receiving corresponding information from said exit sensing means indicating article exit; and means for quickly stopping article transfer in response to said fault signal.

7. The electronic monitoring system of claim 6 wherein said memory stages include bistable multivibrators, and wherein said means for receiving said output signal from said entrance sensing means and coupling information to the first of said memory stages indicating whether an article has entered said apparatus includes a bistable multivibrator the outputs of which are coupled to opposite inputs of said bistable multivibrator of said first memory stage so that said bistable multivibrator of said first memory stage is in one state if an article has entered said apparatus and in the other state if an article has not entered said apparatus.

8. The electronic monitoring system of claim 6 wherein said fault determining means is a bistable multivibrator connected so that a fault signal is produced when the state of said multivibrator is set by information received from the last memory stage and is precluded when the state is set by information received from said exit sensing means.

9. An electronic monitoring system for apparatus wherein articles are successively transferred to a plurality of work stations, said system comprising: an entrance photocell for sensing the entrance of an article to said apparatus and producing a pulse in response thereto; a first trigger circuit connected with said first photocell and triggered by a pulse therefrom to produce a pulse of predetermined width; and entrance bistable multivibrator connected to said first trigger circuit so that the state of said entrance bistable multivibrator is set by said first trigger circuit; a position photocell for sensing article transfer between said plurality of work stations and producing a pulse at each said transfer; shift monostable multivibrator means controlled by the output pulse from said position photocell to produce shift pulses at predetermined times; a plurality of cascaded memory stages equal in number to the number of work stations in said apparatus, each said memory stage having at least one pair of AND gates the output of each of which is connected to opposite inputs of a bistable multivibrator, said AND gates receiving one input from said outputs of the bistable multivibrator of the preceding memory stage except for said first memory stage AND gates which are connected to the outputs of said entrance bistable multivibrator and a shift pulse derived from said position photocell at a second input whereby information as to whether an article has entered the apparatus is successively shifted to the next memory stage concurrently with article transfer; an exit photocell for sensing the exit of an article from said apparatus and producing a pulse in response thereto; an exit trigger circuit triggered by a pulse from said exit photocell to produce an output pulse of predetermined width; an exit bistable multivibrator for receiving at one input the output from said last memory stage if indicative of article entrance and at the other input the output from said exit trigger circuit and producing a fault output only if an article entrance indicating output is received from said last memory stage and no output is received from said exit trigger circuit; and fault actuating means for stopping said apparatus in response to said fault signal.

10. The electronic monitoring system of claim 9 wherein said shift monostable multivibrator means includes a pair of monostable multivibrators the output pulse of one of which is delayed with respect to the other so that a portion of said shift pulses are delayed to faciliate information shifting from stage to stage.

11. The electronic monitoring system of claim 9 wherein said fault actuating means includes a fault trigger circuit triggered by said fault signal to produce a pulse of predetermined width, a fault bistable multivibrator the state of which is set by said pulse from said fault trigger circuit, and a control relay, said relay being energized by said fault bistable multivibrator when set by said fault trigger circuit to stop said apparatus, said fault bistable multivibrator maintaining said apparatus in a stopped condition until said multivibrator is reset.

References Cited

UNITED STATES PATENTS 3,114,902 12/1963 Tanguy ---------- 250—223 X

RALPH G. NILSON, *Primary Examiner.*

T. N. GRIGSBY, *Assistant Examiner.*

U.S. Cl. X.R.

250—214, 220